(12) United States Patent
Seki et al.

(10) Patent No.: US 10,640,665 B2
(45) Date of Patent: May 5, 2020

(54) INK COMPOSITION AND TEXTILE PRINTING METHOD

(71) Applicant: Nippon Kayaku Kabushiki Kaisha, Tokyo (JP)

(72) Inventors: Motohiro Seki, Tokyo (JP); Hiroko Higuchi, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 15/300,134

(22) PCT Filed: Mar. 31, 2015

(86) PCT No.: PCT/JP2015/060250
§ 371 (c)(1),
(2) Date: Sep. 28, 2016

(87) PCT Pub. No.: WO2015/152290
PCT Pub. Date: Oct. 8, 2015

(65) Prior Publication Data
US 2017/0137648 A1    May 18, 2017

(30) Foreign Application Priority Data

Mar. 31, 2014 (JP) ................................ 2014-072572

(51) Int. Cl.
| | | |
|---|---|---|
| C09D 11/322 | (2014.01) | |
| C09D 11/102 | (2014.01) | |
| D06P 5/20 | (2006.01) | |
| D06P 5/30 | (2006.01) | |
| C09D 11/326 | (2014.01) | |
| C09D 153/00 | (2006.01) | |
| C08F 293/00 | (2006.01) | |
| C09D 11/38 | (2014.01) | |
| C09D 11/107 | (2014.01) | |
| C09D 11/03 | (2014.01) | |

(52) U.S. Cl.
CPC ........ *C09D 11/322* (2013.01); *C08F 293/005* (2013.01); *C09D 11/03* (2013.01); *C09D 11/102* (2013.01); *C09D 11/107* (2013.01); *C09D 11/326* (2013.01); *C09D 11/38* (2013.01); *C09D 153/00* (2013.01); *D06P 5/2077* (2013.01); *D06P 5/30* (2013.01)

(58) Field of Classification Search
CPC ..... C09D 11/322; C09D 11/32; C09D 11/326; C09D 11/03; C09D 17/00
See application file for complete search history.

(56) References Cited

U.S. PATENT DOCUMENTS

| | | | | |
|---|---|---|---|---|
| 5,750,592 A | * | 5/1998 | Shinozuka | ........... C09D 11/322 106/31.28 |
| 2004/0182273 A1 | | 9/2004 | Sawada et al. | |
| 2009/0113641 A1 | | 5/2009 | Akatani et al. | |
| 2013/0196124 A1 | | 8/2013 | Flores et al. | |
| 2013/0286119 A1 | | 10/2013 | Cordwell et al. | |
| 2014/0051798 A1 | * | 2/2014 | Spiegel | ................. C09D 11/10 524/557 |
| 2014/0363642 A1 | | 12/2014 | Kawaguchi et al. | |

FOREIGN PATENT DOCUMENTS

| | | | |
|---|---|---|---|
| CN | 101020795 A | 8/2007 | |
| EP | 1724311 | 11/2006 | |
| JP | 4190246 | 4/2004 | |
| JP | 2004-285177 | 10/2004 | |
| JP | 2006-132034 | 5/2006 | |
| JP | 2006-348256 | 12/2006 | |
| JP | 2009-057452 | 3/2009 | |
| JP | 2011-246634 A | 12/2011 | |
| JP | 2013-527267 A | 6/2013 | |
| JP | 2014-001378 A | 1/2014 | |
| JP | 2014-507305 A | 3/2014 | |
| WO | WO 2007/102455 | 9/2007 | |
| WO | WO 2011/123420 A1 | 10/2011 | |
| WO | WO 2012/085541 A2 | 6/2012 | |
| WO | WO-2013115071 A1 * | 8/2013 | ............. C09D 11/03 |
| WO | WO 2013/115071 | 5/2015 | |

OTHER PUBLICATIONS

WIPO translation of front page of WO 2013/115071 having publication date as Aug. 8, 2013. p. 1.*
Kengo et al, Aqueous Pigments Ink for High Photo Quality, ADIC Technical Review No. 10/2004, p. 11-18.
Office Action issued in Chinese Patent Application No. 201580016925. 8, dated Nov. 19, 2018.

* cited by examiner

*Primary Examiner* — Gregory R Delcotto
*Assistant Examiner* — Preeti Kumar
(74) *Attorney, Agent, or Firm* — Knobbe Martens Olson & Bear LLP

(57) ABSTRACT

A pigment ink composition that exhibits good ejectability, particularly after standing in an open environment, and an inkjet textile printing method and a dyeing method using the ink composition. The ink composition for inkjet textile printing includes a pigment, water, a polymeric dispersant, a urethane resin, a water-soluble organic solvent, and a nonionic surfactant.

9 Claims, No Drawings

INK COMPOSITION AND TEXTILE PRINTING METHOD

CROSS-REFERENCE TO RELATED APPLICATIONS

This application is the U.S. National Phase under 35 U.S.C. § 371 of International Application PCT/JP2015/060250, filed Mar. 31, 2015, which was published in Japanese as WO 2015/152290 on Oct. 8, 2015, which claims priority to Japanese Patent Application No. 2014-072572, filed Mar. 31, 2014, the entire contents of which are incorporated herein by reference.

TECHNICAL FIELD

The present invention relates to ink compositions for inkjet textile printing that comprise a pigment, water, a polymeric dispersant, a urethane resin, a water-soluble organic solvent, and a nonionic surfactant and also relates to inkjet textile printing methods, dyeing methods, and dyed articles using such ink compositions.

BACKGROUND ART

With the ongoing digitization in the information industry, inkjet recording has been widely used as a recording (printing) method in homes and businesses. Inkjet recording, which allows high-quality, high definition images to be recorded, has been used not only in printing on paper, but also in textile printing on fibers.

As is generally known, when an ink comprising a pigment as a colorant is printed on a fiber, the pigment does not permeate or dye the fiber, but remains on the surface of the fiber; therefore, a binder component is required to fix the pigment to the fiber. However, an ink comprising a large amount of binder component comprises, for example, a reduced amount of solvent for retaining moisture. Such an ink has a problem in that it dries quickly and thus causes ejection failure in printers and ejection failure and head clogging after standing in an open environment. Accordingly, there is a strong need to solve this problem.

The problem of the ejectability of inkjet inks comprising pigments is disclosed in PTLs 1 and 2.

CITATION LIST

Patent Literature

PTL 1: Japanese Patent No. 4190246
PTL 2: Japanese Unexamined Patent Application Publication No. 2009-57452

Non Patent Literature

NPL 1: DIC Technical Review No. October/2004

SUMMARY OF INVENTION

Technical Problem

An object of the present invention is to provide a pigment ink composition that exhibits good ejectability, particularly after standing in an open environment, and an inkjet textile printing method and a dyeing method using such an ink composition.

Solution to Problem

After conducting extensive research to achieve the foregoing object, the inventors have found that the object can be achieved by an ink composition comprising a pigment, water, a polymeric dispersant, a urethane resin, a water-soluble organic solvent, and a nonionic surfactant, which has led to the present invention. Specifically, the present invention relates to Items 1) to 15) below.

1) An ink composition for inkjet textile printing, comprising a pigment, water, a polymeric dispersant, a urethane resin, a water-soluble organic solvent, and a nonionic surfactant.

2) The ink composition according to above Item 1), wherein the polymeric dispersant is an A-B block polymer obtained from copolymerization by living radical polymerization using a polymerization initiator,
the polymerization initiator being a mixture of an organic tellurium compound represented by formula (1) and an organic ditellurium compound represented by formula (2) or a mixture of an organic tellurium compound represented by formula (1), an azo polymerization initiator, and an organic ditellurium compound represented by formula (2):

[Chem.1]

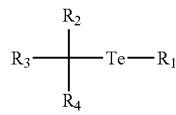

(1)

(wherein, $R^1$ represents a $C_1$-$C_8$ alkyl group, an aryl group, a substituted aryl group, or an aromatic heterocyclic group; $R^2$ and $R^3$ represent a hydrogen atom or a $C_1$-$C_8$ alkyl group; and $R^4$ represents an aryl group, a substituted aryl group, an aromatic heterocyclic group, an acyl group, an amide group, an oxycarbonyl group, or a cyano group); and

[Chem. 2]

$$(R_1Te)_2 \quad (2)$$

(wherein, $R^1$ has the same meaning as that of $R^1$ in the above formula (1)),
the A-B block polymer comprising an A block and a B block,
the A block comprising at least one monomer represented by formula (3):

[Chem. 3]

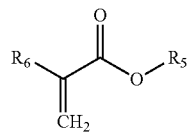

(3)

(wherein, $R^5$ represents a hydrogen atom, an alkyl group having 4 carbon atoms which may have a branch; and $R^6$ represents a hydrogen atom or a methyl group),
the B block comprising benzyl methacrylate and/or benzyl acrylate.

3) The ink composition according to above Item 2), wherein the at least one monomer represented by formula (3) is a monomer represented by formula (3) where $R_5$ is a hydrogen atom and $R_6$ is a methyl group and/or a monomer represented by formula (3) where $R_5$ is a n-butyl group and $R_6$ is a methyl group.

4) The ink composition according to any one of above Items 1) to 3), wherein, based on the total mass of the ink composition, the pigment is present in an amount of 1% to 15% by mass, the polymeric dispersant is present in an amount of 0.1% to 15% by mass, the urethane resin is present in an amount of 1% to 20% by mass, the water-soluble organic solvent is present in an amount of 10% to 45% by mass, and the nonionic surfactant is present in an amount of 0.01% to 5% by mass, the balance being water.

5) The ink composition according to any one of above Items 1) to 4), wherein the urethane resin is a polycarbonate urethane resin.

6) The ink composition according to any one of above Items 1) to 5), wherein the water-soluble organic solvent comprises a polyglyceryl ether and a C2-C6 diol.

7) The ink composition according to any one of above Items 1) to 6), wherein the ink composition has a surface tension of 20 to 40 mN/m and a viscosity of 2 to 10 mPa·s at 25° C.

8) A method for manufacturing the ink composition according to any one of above Items 1) to 7), wherein the polymeric dispersant is an A-B block polymer, the method comprising:

performing copolymerization by living radical polymerization using a polymerization initiator to obtain the A-B block polymer;

dispersing the pigment in a solution of the polymeric dispersant in the water-soluble organic solvent to obtain a pigment dispersion; and adding water, the urethane resin, and the nonionic surfactant to the pigment dispersion to obtain the ink composition, the polymerization initiator being a mixture of an organic tellurium compound represented by formula (1) and an organic ditellurium compound represented by formula (2) or a mixture of an organic tellurium compound represented by formula (1), an azo polymerization initiator, and an organic ditellurium compound represented by formula (2):

[Chem. 4]

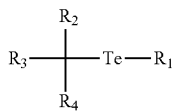

(1)

(wherein, $R^1$ represents a $C_1$-$C_8$ alkyl group, an aryl group, a substituted aryl group, or an aromatic heterocyclic group; $R^2$ and $R^3$ represent a hydrogen atom or a $C_1$-$C_8$ alkyl group; and $R^4$ represents an aryl group, a substituted aryl group, an aromatic heterocyclic group, an acyl group, an amide group, an oxycarbonyl group, or a cyano group); and

[Chem. 5]

$$(R_1Te)_2 \quad (2)$$

(wherein, $R^1$ has the same meaning as that of $R^1$ in the above formula (1)), the A-B block polymer comprising an A block and a B block, the A block comprising at least one monomer represented by formula (3):

[Chem. 6]

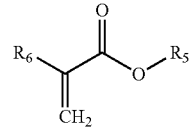

(3)

(wherein, $R^5$ represents a hydrogen atom, an alkyl group having 4 carbon atoms which may have a branch; and $R^6$ represents a hydrogen atom or a methyl group), the B block comprising benzyl methacrylate and/or benzyl acrylate.

9) Use of the ink composition according to any one of above Items 1) to 7) for inkjet textile printing.

10) An inkjet textile printing method comprising performing textile printing by ejecting a droplet of the ink composition according to any one of above Items 1) to 7) onto a recording medium in response to a recording signal.

11) The inkjet textile printing method according to above Item 10), wherein the recording medium is a fiber selected from the group consisting of polyesters, celluloses, polyamides, and natural fibers, a fiber blend comprising the fiber, or a fabric comprising the fiber.

12) A recording medium subjected to textile printing by the inkjet textile printing method according to above Item 10) or 11).

13) An inkjet dyeing method comprising performing dyeing by steaming or baking a recording medium subjected to textile printing by the inkjet textile printing method according to above Item 10) or 11).

14) The inkjet dyeing method according to above Item 13), wherein the recording medium is steamed or baked at 80° C. to 250° C. for 10 seconds to 30 minutes.

15) A dyed article obtained by the inkjet dyeing method according to above Item 13) or 14).

Advantageous Effects of Invention

The present invention provides a pigment ink composition that exhibits good ejectability, particularly after standing in an open environment, and an inkjet textile printing method and a dyeing method using such an ink composition.

DESCRIPTION OF EMBODIMENTS

As used herein, all parts and percentages are by mass throughout the specification, including the Examples, unless otherwise specified.

[Pigment]

The pigment may be any known pigment. Known pigments include inorganic pigments, organic pigments, and extender pigments.

Examples of inorganic pigments include carbon black, metal oxides, hydroxides, sulfides, ferrocyanides, and metal chlorides. Among these, carbon black is preferred as a black pigment.

There are various types of carbon black, including thermal black and acetylene black, which are obtained by a thermal decomposition method, and oil furnace black, gas furnace black, lamp black, gas black, and channel black, which are obtained by an incomplete combustion method.

Among these, preferred types of carbon black include acetylene black, oil furnace black, gas furnace black, lamp black, and channel black.

Specific examples of carbon black include Raven 760 ULTRA, Raven 780 ULTRA, Raven 790 ULTRA, Raven 1060 ULTRA, Raven 1080 ULTRA, Raven 1170, Raven 1190 ULTRA II, Raven 1200, Raven 1250, Raven 1255, Raven 1500, Raven 2000, Raven 2500 ULTRA, Raven 3500, Raven 5000 ULTRA II, Raven 5250, Raven 5750, and Raven 7000 (available from Columbian Carbon Company); Monarch 700, Monarch 800, Monarch 880, Monarch 900, Monarch 1000, Monarch 1100, Monarch 1300, Monarch 1400, Regal 1330R, Regal 1400R, Regal 1660R, and Mogul L (available from Cabot Corporation); Color Black FW1, Color Black FW2, Color Black FW2V, Color Black FW200, Color Black S150, Color Black S160, Color Black S170, Printex 35, Printex U, Printex V, Printex 140U, Printex 140V, SpecIal Black 4, SpecIal Black 4A, SpecIal Black 5, and Special Black 6 (available from Evonik Degussa GmbH); and MA7, MA8, MA100, MA600, MCF-88, No. 25, No. 33, No. 40, No. 47, No. 52, No. 900, and No. 2300 (available from Mitsubishi Chemical Corporation).

Preferred white pigments include metal oxides. Examples of metal oxides include zinc oxide, titanium oxide, and zirconium oxide, preferably titanium oxide. Examples of titanium oxide include rutile type and anatase type. Titanium oxide may be directly used in powder form or may be surface-treated with other materials such as silicon dioxide, aluminum oxide, zirconium oxide, zinc oxide, and hydroxy group-comprising organic compounds. Preferred among these is surface-treated titanium oxide.

Specific examples of titanium oxide include DUAWHITE TCR-52, TITONE R-32, TIATONE R-7E, TITONE R-21, TITONE R-62N, and TITONE R-42 (available from Sakai Chemical Industry Co., Ltd.); TIPAQUE CR-50, TIPAQUE CR-50-2, TIPAQUE CR-58, TIPAQUE CR-60, TIPAQUE CR-80, and TIPAQUE CR-90 (available from Ishihara Sangyo Kaisha, Ltd.); TITANIX JA-600A and TITANIX JR-605 (available from Tayca Corporation); and ST-455, ST-455WB, ST-457SA, and ST-457EC (available from Titan Kogyo, Ltd.).

Examples of organic pigments include azo pigments, which have at least one azo group in the molecule, phthalocyanine pigments, quinacridone pigments, isoindolinone pigments, dioxazine pigments, perylene pigments, perinone pigments, thioindigo pigments, anthraquinone pigments, and quinophthalone pigments.

Specific examples of organic pigments include yellow pigments such as C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 155, 180, 185, 193, 199, and 202; red pigments such as C.I. Pigment Red 5, 7, 12, 48, 48:1, 57, 88, 112, 122, 123, 146, 149, 166, 168, 177, 178, 179, 184, 185, 202, 206, 207, 254, 255, 257, 260, 264, and 272; blue pigments such as C.I. Pigment Blue 1, 2, 3, 15, 15:1, 15:2, 15:3, 15:4, 15:6, 16, 22, 25, 60, 66, and 80; violet pigments such as C.I. Pigment Violet 19, 23, 29, 37, 38, and 50; orange to brown pigments such as C.I. Pigment Orange 13, 16, 36, 34, 43, 68, 69, 71, and 73; green pigments such as C.I. Pigment Green 7, 36, and 54; and black pigments such as C.I. Pigment Black 1.

Examples of extender pigments include silica, calcium carbonate, talc, clay, barium sulfate, and white carbon. Although these extender pigments may be used alone, they are typically used in combination with inorganic or organic pigments.

These pigments are typically used alone. However, a combination of two or more pigments may be used if necessary. Examples of such combinations include combinations of organic pigments and extender pigments and combinations of organic pigments and inorganic pigments. To control fluidity, organic and inorganic pigments may be used in combination with extender pigments.

To adjust the color of dyed articles, two or more pigments selected from organic and inorganic pigments may be used in combination. This color adjustment is intended, for example, to obtain a dyed article with different shades of color or to extend the range of colors available for dyeing. For such purposes, several organic pigments may be used in combination to achieve the desired color.

[Polymeric Dispersant]

The polymeric dispersant is an A-B block polymer obtained from copolymerization by living radical polymerization using a polymerization initiator. The polymerization initiator is a mixture of an organic tellurium compound represented by formula (1) above and an organic ditellurium compound represented by formula (2) above or a mixture of an organic tellurium compound represented by formula (1) above, an azo polymerization initiator, and an organic ditellurium compound represented by formula (2) above. The term "A-B block polymer" refers to a polymer in which an A polymer and a B polymer are chemically combined together, and the symbols "A" and "B" refer to polymers of different monomers. The segments (blocks) derived from the A polymer and the B polymer in the A-B block polymer are also referred to as "A block" and "B block", respectively, throughout the specification.

In formula (1) above, $R_1$ is a $C_1$-$C_8$ alkyl group, an aryl group, a substituted aryl group, or an aromatic heterocyclic group. $R_2$ and $R_3$ are a hydrogen atom or a $C_1$-$C_8$ alkyl group. $R_4$ is an aryl group, a substituted aryl group, an aromatic heterocyclic group, an acyl group, an amide group, an oxycarbonyl group, or cyano group.

Examples of $C_1$-$C_8$ alkyl groups for $R_1$ in formula (1) above include linear, branched, and cyclic alkyl groups of 1 to 8 carbon atoms, such as methyl, ethyl, n-propyl, isopropyl, cyclopropyl, n-butyl, sec-butyl, tert-butyl, cyclobutyl, n-pentyl, n-hexyl, n-heptyl, and n-octyl, where the linear alkyl groups have 1 to 8 carbon atoms and the branched and cyclic alkyl groups have 3 to 8 carbon atoms, preferably linear and branched alkyl groups of 1 to 4 carbon atoms, where the branched alkyl groups have 3 or 4 carbon atoms, more preferably linear alkyl groups of 1 to 4 carbon atoms, even more preferably methyl, ethyl, and n-butyl.

Examples of aryl groups include phenyl and naphthyl, preferably phenyl.

Examples of substituted aryl groups include substituted phenyl and substituted naphthyl groups. Examples of substituents include halogen, hydroxy, alkoxy, amino, nitro, cyano, carbonyl-comprising groups represented by the formula —CORa (where Ra is an alkyl group of 1 to 8 carbon atoms, an aryl group, an alkoxy group of 1 to 8 carbon atoms, or an aryloxy group), sulfonyl, and trifluoromethyl, preferably trifluoromethyl-substituted phenyl. These substituted aryl groups are preferably mono- or disubstituted, more preferably para- or ortho-substituted, even more preferably para-substituted.

Examples of aromatic heterocyclic groups include pyridyl, pyrrolyl, furyl, and thienyl.

Examples of $C_1$-$C_8$ alkyl groups for $R_2$ and $R_3$ in formula (1) above include those listed above for $R_1$.

Examples of aryl, substituted aryl, and aromatic heterocyclic groups for $R_4$ in formula (1) above include those listed above for $R_1$ in formula (1).

Examples of acyl groups include formyl, acetyl, and benzoyl.

Examples of amide groups include carboxamides such as acetamide, malonamide, succinamide, maleamide, benzamide, and 2-furamide; thioamides such as thioacetamide, hexanedithioamide, thiobenzamide, and methanethiosulfonamide; selenoamides such as selenoacetamide, hexanediselenoamide, selenobenzamide, and methaneselenosulfonamide; and N-substituted amides such as N-methylacetamide, benzanilide, cyclohexanecarboxanilide, and 2,4'-dichloroacetanilide.

Examples of oxycarbonyl groups include alkoxycarbonyl and aryloxycarbonyl groups, preferably those represented by the formula —COORb (wherein, Rb is H, an alkyl group of 1 to 8 carbon atoms, or an aryl group). Specific examples include a carboxy group; alkoxycarbonyl groups having a linear or branched alkoxy moiety of 1 to 8 carbon atoms, preferably 1 to 5 carbon atoms, such as methoxycarbonyl, ethoxycarbonyl, propoxycarbonyl, n-butoxycarbonyl, sec-butoxycarbonyl, tert-butoxycarbonyl, and n-pentoxycarbonyl; and aryloxycarbonyl groups having an aryl moiety of 1 to 10 carbon atoms, preferably 1 to 8 carbon atoms, such as phenoxycarbonyl. Particularly preferred are alkoxycarbonyl groups having a linear or branched alkoxy moiety of 1 to 4 carbon atoms, more preferably methoxycarbonyl and ethoxycarbonyl.

Preferred organic tellurium compounds represented by formula (1) above include those where $R_1$ is an alkyl group of 1 to 4 carbon atoms, $R_2$ and $R_3$ are hydrogen atom or an alkyl group of 1 to 4 carbon atoms, and $R_4$ is an aryl group, a substituted aryl group, or an oxycarbonyl group.

Particularly preferred are those where $R_1$ is an alkyl group of 1 to 4 carbon atoms, $R_3$ and $R_4$ are a hydrogen atom or an alkyl group of 1 to 4 carbon atoms, and $R_5$ is a phenyl group, a substituted phenyl group, a methoxycarbonyl group, or an ethoxycarbonyl group.

Specific representative examples of such organic tellurium compounds include (methyltellanylmethyl)benzene, (1-methyltellanylethyl)benzene, 1-chloro-4-(1-methyltellanylethyl)benzene, 1-trifluoromethyl-4-(1-methyltellanylethyl)benzene, 3,5-bis-trifluoromethyl-1-(1-methyltellanylethyl)benzene, 1,2,3,4,5-pentafluoro-6-(1-methyltellanylethyl)benzene, 2-methyltellanylpropionitrile, (2-methyltellanylpropyl)benzene, methyl-2-methyltellanyl-2-methyl propionate, ethyl-2-methyltellanyl-2-methyl propionate, ethyl-2-methyltellanyl propionate (BTEE), and 2-methyltellanyl-2-methylpropionitrile. Also included are all of those where the methyltellanyl moiety is replaced with ethyltellanyl, n-butyltellanyl, n-octyltellanyl, or the like. Other examples include all the organic tellurium compounds disclosed in International Publication No. 2004/014962 (page 4, line 25 to page 7, line 18).

The amount of organic tellurium compound used may be adjusted to obtain a polymer having the target number average molecular weight. The preferred amount (in moles) of organic tellurium compound used is roughly the mass (in grams) of the starting vinyl monomers divided by the target number average molecular weight of the polymer, preferably about 0.3 to 3 times that amount, depending on the case.

In addition to the organic tellurium compound represented by formula (1) above for use as the polymerization initiator, an organic ditellurium compound (ditelluride) represented by formula (2) above may be added, depending on the types of vinyl monomers to be polymerized.

Preferred organic ditellurium compounds represented by formula (2) above include those where $R_1$ is an alkyl group of 1 to 4 carbon atoms or an aryl group, a substituted aryl group, or aromatic heterocyclic group, more preferably those where $R_1$ is an alkyl group of 1 to 4 carbon atoms or an aryl group, even more preferably those where $R_1$ is an alkyl group of 1 to 4 carbon atoms. Examples of alkyl groups of 1 to 4 carbon atoms include linear, branched, and cyclic alkyl groups of 1 to 4 carbon atoms, where the linear alkyl groups have 1 to 4 carbon atoms and the branched and cyclic alkyl groups have 3 or 4 carbon atoms, preferably linear and branched alkyl groups of 1 to 4 carbon atoms, more preferably linear alkyl groups of 1 to 4 carbon atoms.

Specific examples of such ditellurides include dimethyl ditelluride, diethyl ditelluride, di-n-propyl ditelluride, diisopropyl ditelluride, dicyclopropyl ditelluride, di-n-butyl ditelluride, di-sec-butyl ditelluride, di-tert-butyl telluride, dicyclobutyl telluride, diphenyl ditelluride, bis-(p-methoxyphenyl) ditelluride, bis-(p-aminophenyl) ditelluride, bis-(p-nitrophenyl) ditelluride, bis-(p-cyanophenyl) ditelluride, bis-(p-sulfonylphenyl) ditelluride, dinaphthyl ditelluride, and dipyridyl ditelluride.

Preferred ditellurides include dimethyl ditelluride, diethyl ditelluride, di-n-propyl ditelluride, di-n-butyl ditelluride, and diphenyl ditelluride.

Particularly preferred are dimethyl ditelluride, diethyl ditelluride, di-n-propyl ditelluride, and di-n-butyl ditelluride.

The ditelluride represented by formula (2) above, if used, is preferably used in an amount of 0.01 to 100 mol, more preferably 0.1 to 10 mol, even more preferably 0.1 to 5 mol, per mole of the organic tellurium compound represented by formula (1) above for use as the polymerization initiator.

In addition to the organic tellurium compounds, an azo polymerization initiator may be used in the polymerization process in the present invention. The azo polymerization initiator may be any initiator commonly used for radical polymerization. Examples of such azo polymerization initiators include 2,2'-azobis(isobutyronitrile) (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl 2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutylamide), 2,2'-azobis(4-methoxy-2,4-dimethylvaleronitrile), 2,2'-azobis(2-methylamidinopropane) dihydrochloride, 2,2'-azobis[2-(2-imidazolin-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-methylpropionamide).

It is preferred to select any suitable azo polymerization initiator depending on the reaction conditions.

For example, preferred azo polymerization initiators for polymerization at low temperatures (i.e., below 40° C.) include 2,2'-azobis(2,4-dimethylvaleronitrile) (ADVN) and 2,2'-azobis(4-methoxy-2,4-dimethylvaleronitrile). Preferred azo polymerization initiators for polymerization at medium temperatures (i.e., at 40° C. to 80° C.) include 2,2'-azobis(isobutyronitrile) (AIBN), 2,2'-azobis(2-methylbutyronitrile) (AMBN), dimethyl 2,2'-azobisisobutyrate (MAIB), and 1,1'-azobis(1-acetoxy-1-phenylethane). Preferred azo polymerization initiators for polymerization at high temperatures (i.e., above 80° C.) include 1,1'-azobis(1-cyclohexanecarbonitrile) (ACHN), 2-cyano-2-propylazoformamide, 2,2'-azobis(N-butyl-2-methylpropionamide), 2,2'-azobis(N-cyclohexyl-2-methylpropionamide), and 2,2'-azobis(2,4,4-trimethylpentane).

Preferred azo polymerization initiators for reactions in aqueous solvents include 4,4'-azobis(4-cyanovaleric acid) (ACVA), 2,2'-azobis(2-methylbutylamide), 2,2'-azobis(2- methylamidinopropane) dihydrochloride, 2,2'-azobis[2-(2-imidazolin-2-yl)propane], and 2,2'-azobis[2-methyl-N-(2-hydroxyethyl)propionamide].

The azo polymerization initiator, if used, is preferably used in an amount of 0.01 to 100 mol, more preferably 0.1 to 10 mol, even more preferably 0.1 to 5 mol, per mole of the organic tellurium compound represented by formula (1) above for use as the polymerization initiator.

A polymeric dispersant prepared using, as a polymerization initiator, a mixture of an organic tellurium compound represented by formula (1) above and an organic ditellurium compound represented by formula (2) above or a mixture of an organic tellurium compound represented by formula (1) above, an azo polymerization initiator, and an organic ditellurium compound represented by formula (2) above is characterized in that the constituents of the polymeric dispersant include organic tellurium compounds. The total tellurium content of the dispersant may be determined by a known metal analysis method such as ICP emission spectroscopy or atomic absorption spectroscopy.

The tellurium content of the ink composition comprising the polymeric dispersant may be determined to be, for example, 1 to 65 ppm, preferably 1 to 40 ppm, depending on factors such as the content of the polymeric dispersant and the method for preparing the pigment dispersion, described later.

In the present invention, the A polymer (A block) is formed from a monomer represented by formula (3) above, and the B polymer (B block) is formed from benzyl methacrylate and/or benzyl acrylate.

In formula (3), $R_5$ is a hydrogen atom or an optionally branched $C_4$ alkyl group, and $R_6$ is a hydrogen atom or a methyl group. Preferred monomers include one where $R_5$ is a hydrogen atom and $R_6$ is a methyl group (i.e., methacrylic acid) and one where $R_5$ is a n-butyl group and $R_6$ is a methyl group (i.e., butyl methacrylate). In particular, it is preferred to use these two monomers in combination. In this case, the mass ratio of butyl methacrylate to methacrylic acid (butyl methacrylate/methacrylic acid) is preferably 1.3 to 2.2, more preferably 1.5 to 2.0, even more preferably 1.6 to 1.8.

The B polymer is formed from at least one monomer selected from benzyl methacrylate and benzyl acrylate, preferably benzyl methacrylate. In addition to the at least one monomer selected from benzyl methacrylate and benzyl acrylate, the B block may comprise a monomer represented by formula (3) above, preferably acrylic acid and/or methacrylic acid, more preferably methacrylic acid, in an amount of 1% by mass or less, preferably 0.5% by mass or less, more preferably 0.2% by mass or less, of the at least one monomer selected from benzyl methacrylate and benzyl acrylate.

The mass percentage of the A block to the B block in the A-B block polymer is preferably 60% to 90% by mass, more preferably 65% to 85% by mass, even more preferably 70% to 80% by mass.

The polymeric dispersant preferably has an acid value of 90 to 200 mg KOH/g, more preferably 100 to 150 mg KOH/g, even more preferably 100 to 120 mg KOH/g, most preferably 100 to 110 mg KOH/g. An extremely low acid value may result in the problem of decreased solubility in water or other liquid media, whereas an extremely high acid value may result in a poor color.

The polymeric dispersant preferably has a weight average molecular weight of 10,000 to 60,000, more preferably 10,000 to 40,000, most preferably 15,000 to 30,000. An extremely large or small weight average molecular weight results in decreased dispersion stability. As used herein, the term "weight average molecular weight (Mw)" refers to the molecular weight determined by gel permeation chromatography (GPC) against polystyrene standards using an N-methylpyrrolidone (NMP) buffer solution as a solvent.

The amount of polymeric dispersant used is generally expressed as the dispersant-to-pigment ratio. The dispersant-to-pigment ratio may be calculated by the following equation:

Dispersant-to-pigment ratio=polymeric dispersant/ pigment where the amounts of polymeric dispersant and pigment are by mass.

The dispersant-to-pigment ratio is preferably 0.1 to 1.0, more preferably 0.1 to 0.6, particularly preferably 0.2 to 0.4. An extremely high or low dispersant-to-pigment ratio may result in decreased dispersion stability and poor print image quality.

A neutralizer is required to dissolve the polymeric dispersant in water. Examples of neutralizers include alkali metal hydroxides, alkaline earth metal hydroxides, aliphatic amines, and alcohol amines.

Examples of alkali metal hydroxides include lithium hydroxide, sodium hydroxide, and potassium hydroxide. Examples of alkaline earth metal hydroxides include beryllium hydroxide, magnesium hydroxide, calcium hydroxide, and strontium hydroxide. Preferred among these are alkaline earth metal hydroxides, more preferably lithium hydroxide and sodium hydroxide.

Examples of alcohol amines include monoethanolamine, diethanolamine, triethanolamine, monopropanolamine, dipropanolamine, tripropanolamine, methylethanolamine, dimethylethanolamine, and N-methyldiethanolamine, preferably tertiary amines, even more preferably triethanolamine.

Examples of aliphatic amines include ammonia, monomethylamine, dimethylamine, trimethylamine, monoethylamine, dimethylamine, and trimethylamine, preferably ammonia and triethylamine.

These neutralizers may be used alone or in combination.

The neutralizer may be used in any desired amount. The polymeric dispersant is said to be neutralized to 100% when the amount of neutralizer used is theoretically equivalent to the acid value of the polymeric dispersant, and the amount of neutralizer used may exceed that amount. The polymeric dispersant is preferably neutralized to 50% to 200%, more preferably 80% to 150%, most preferably 100% to 120%.

If the polymeric dispersant has an acid value of more than 200 mg KOH/g, it may provide the same performance as a dispersant having a low acid value when neutralized to less than 100%.

The pigment may be a microencapsulated pigment, which is a pigment coated with a polymeric dispersant, or may be an unmicroencapsulated pigment. Preferred among these are microencapsulated pigments, which are pigments coated with a polymeric dispersant.

For example, there are known processes for coating a pigment with a polymeric dispersant. These processes are generally divided into two types: physical/mechanical processes and chemical processes. Examples of the latter, i.e., chemical processes, that have been proposed include surface precipitation, mixing, and interfacial polymerization. NPL 1 specifically discloses the performance of microencapsulated pigments. Surface precipitation, including acid precipitation and phase inversion emulsification, is the process of precipitating a polymeric dispersant on the surface of a pigment by adjusting the pH or utilizing the difference in solubility in media. Interfacial polymerization, also known as surface polymerization, is a method of performing polymerization reaction after a monomer, an oligomer, or a pigment derivative is adsorbed on the pigment surface. Although any of these processes may be used, it is preferred to use surface precipitation, more preferably phase inversion emulsification.

Pigments coated with a polymeric dispersant typically have an average particle size of 200 nm or less, preferably 50 to 150 nm, more preferably 60 to 140 nm. Such pigments tend to have good ejection stability and dispersion stability and to form a recorded image with high print density.

The average particle size can be determined, for example, by laser light scattering.

Examples of processes for dispersing the pigment include those using sand mills (bead mills), roller mills, ball mills, paint shakers, sonicators, and microfluidizers, preferably sand mills (bead mills). It is also desirable to prepare a pigment dispersion using a sand mill (bead mill) under conditions with improved dispersion efficiency, for example, using beads having small systems (0.01 mm to 1 mm in diameter) to increase the filling factor of the beads.

A pigment dispersion prepared under such conditions has a small particle size and thus has good dispersibility. It is also preferred to remove components such as large pigment particles from the dispersion, for example, by filtration and/or centrifugation. An extremely small amount of anti-foaming agent, such as a silicone or acetylene glycol anti-foaming agent as described above, may be added for purposes such as inhibiting foaming during the preparation of the dispersion. Since some anti-foaming agents interfere with dispersion and atomization, it is preferred to use an anti-foaming agent that does not affect dispersion or stability after dispersion.

[Urethane Resin]

Urethane resins are often marketed in the form of a latex (emulsion) and are readily available. Specific examples of such urethane resins include Permarin UA-150, 200, 310, 368, and 3945 and Ucoat UX-320 latexes (available from Sanyo Chemical Industries, Ltd.), Hydran WLS-201, 210, and HW-312B latexes (available from DIC Corporation), and Superflex 150, 170, and 470 (available from DKS Co. Ltd.), many of which are resin emulsions with solids contents of 30% to 60%.

Although any of the latexes described above may be used as the urethane resin, it is preferred to use a polycarbonate urethane resin. Examples of such resins include Permarin UA-310 and 3945 and Ucoat UX-320, preferably Ucoat UX-320. A single urethane resin may be used, or two or three urethane resins may be used in combination.

[Water-Soluble Organic Solvent]

Examples of water-soluble organic solvents include C1-C4 monools such as methanol, ethanol, n-propanol, isopropanol, n-butanol, isobutanol, sec-butanol, and tert-butanol; C2-C6 diols such as ethylene glycol, 1,2-propylene glycol, 1,3-propylene glycol, 1,2-butylene glycol, 1,4-butylene glycol, 1,3-pentanediol, 1,5-pentanediol, 1,2-hexanediol, and 1,6-hexanediol; C3-C6 triols such as glycerol, hexane-1,2,6-triol, and trimethylolpropane; carboxamides such as N,N-dimethylformamide and N,N-dimethylacetamide; heterocyclic ureas such as 2-pyrrolidone, N-methyl-2-pyrrolidone, 1,3-dimethylimidazolidin-2-one, and 1,3-dimethylhexahydropyrimid-2-one; ketones and keto alcohols such as acetone, methyl ethyl ketone, and 2-methyl-2-hydroxypentan-4-one; linear and cyclic ethers such as 1,2-dimethoxyethane, tetrahydrofuran, and dioxane; C2-C3 di- and trialkylene glycols and thioglycols such as diethylene glycol, triethylene glycol, dipropylene glycol, and thiodiglycol; C2-C3 polyalkylene glycols comprising four or more repeat units and having a molecular weight of about 20,000 or less (preferably in liquid form) such as tetraethylene glycol, polyethylene glycol (preferably those having molecular weights of 2,000 or less, e.g., 400, 800, or 1,540), and polypropylene glycol; polyglyceryl ethers such as diglycerol, triglycerol, and polyglycerol; C2-C3 polyoxyalkylene polyglyceryl ethers such as polyoxyethylene polyglyceryl ether and polyoxypropylene polyglyceryl ether; C1-C4 alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, triethylene glycol monoethyl ether, and triethylene glycol monobutyl ether; cyclic esters and carbonates such as γ-butyrolactone and ethylene carbonate; dimethyl sulfoxide; and acetic acid.

Preferred among these are C2-C6 diols (particularly 1,2-propylene glycol); C3-C6 triols (particularly glycerol); polyglyceryl ethers (particularly diglycerol); and C1-C4 alkyl ethers of polyhydric alcohols (particularly butyl carbitol).

These water-soluble organic solvents may be used alone or in combination. Among these, it is preferred to use a combination of a polyglyceryl ether (preferably glycerol and/or diglycerol) and a C2-C6 diol (preferably ethylene glycol, 1,2-propylene glycol, or 1,3-propylene glycol, more preferably ethylene glycol or 1,2-propylene glycol).

[Nonionic Surfactant]

Examples of nonionic surfactants include ethers such as polyoxyethylene nonylphenyl ether, polyoxyethylene octylphenyl ether, polyoxyethylene dodecylphenyl ether, polyoxyethylene oleyl ether, polyoxyethylene lauryl ether, and polyoxyethylene alkyl ethers; esters such as polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; acetylene glycols (alcohols) such as 2,4,7,9-tetramethyl-5-decyne-4,7-diol, 3,6-dimethyl-4-octyne-3,6-diol, and 3,5-dimethyl-1-hexyn-3-ol; and Surfynol 104, 105PG50, 82, 420, 440, 465, 485, and DF-110D and Olfine STG (trade names) available from Nissin Chemical Industry Co., Ltd.; polyglycol ethers (e.g., TergItol 15-S-7 available from Sigma-Aldrich). These nonionic surfactants may be used alone or in a mixture. Preferred nonionic surfactants include the Surfynol series, more preferably Surfynol 420.

Based on the total mass of the ink composition for inkjet textile printing, the individual ingredients may be present in the following amounts:

Pigment: typically 1% to 15%, preferably 1% to 10%, more preferably 1% to 7%.

Polymeric dispersant: typically 0.1% to 15%, preferably 0.1% to 9%, more preferably 0.2% to 6%.

Urethane resin: typically 1% to 20%, preferably 3% to 15%, more preferably 3% to 12%.

Water-soluble organic solvent: typically 10% to 45%, preferably 15% to 38%, more preferably 20% to 35%.

Nonionic surfactant: typically 0.01% to 5%, preferably 0.05% to 3%, more preferably 0.1% to 2.5%.

The balance is water.

The content of the urethane resin is on a solid basis.

The ink composition may be prepared by any method. Typically, the ink composition is prepared by preparing an aqueous pigment dispersion comprising the pigment and the polymeric dispersant and then adding the urethane resin, the water-soluble organic solvent, the nonionic surfactant, and optionally other ingredients.

Other ink preparation agents may also be used in the preparation of the ink composition. Examples of such ink preparation agents include preservatives, fungicides, pH adjusters, chelating agents, rust preventive agents, water-soluble ultraviolet absorbers, water-soluble polymeric compounds, antioxidants, and surfactants. These ink preparation agents are described below.

Specific examples of fungicides include sodium dehydroacetate, sodium benzoate, sodium pyridinethione-1-oxide, ethyl p-hydroxybenzoate, 1,2-benzisothiazolin-3-one, and salts thereof.

Examples of preservatives include organosulfur compounds, organonitrogen-sulfur compounds, organohalogen compounds, haloaryl sulfones, iodopropargyl compounds, haloalkylthio compounds, nitriles, pyridines, 8-oxyquinolines, benzothiazoles, isothiazolines, dithiols, pyridine oxides, nitropropanes, organotin compounds, phenol compounds, quaternary ammonium salts, triazines, thiazines, anilides, adamantanes, dithiocarbamates, bromoindanones, benzyl bromoacetate, and inorganic salts.

Specific examples of organohalogen compounds include sodium pentachlorophenol. Specific examples of pyridine oxides include sodium 2-pyridinethiol-1-oxide. Specific examples of isothiazolines include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Other specific examples of preservatives and fungicides include anhydrous sodium acetate, sodium sorbate, sodium benzoate, and Proxel GXL(S) and Proxel XL-2(S) (trade names) available from Arch Chemicals, Inc.

The pH adjuster may be any substance that allows the pH of the ink to be prepared to be adjusted to, for example, 5 to 11 without adversely affecting the ink. Examples of such substances include those listed above in the description of the neutralizer for neutralizing the polymeric dispersant.

Other specific examples include alkali metal carbonates such as lithium carbonate, sodium carbonate, sodium hydrogen carbonate, and potassium carbonate; alkali metal salts of organic acids, such as sodium silicate and potassium acetate; and phosphates such as disodium phosphate.

Specific examples of chelating agents include disodium ethylenediaminetetraacetate, sodium nitrilotriacetate, sodium hydroxyethylethylenediaminetriacetate, sodium diethylenetriaminepentaacetate, and sodium uracil diacetate.

Specific examples of rust preventive agents include acidic sulfites, sodium thiosulfate, ammonium thioglycolate, diisopropylammonium nitrite, pentaerythritol tetranitrate, and dicyclohexylammonium nitrite.

Specific examples of water-soluble ultraviolet absorbers include sulfonated benzophenones, benzotriazoles, salicylates, cinnamates, and triazines.

Specific examples of water-soluble polymeric compounds include polyvinyl alcohol, cellulose derivatives, polyamines, and polyimines.

Examples of antioxidants include various organic and metal complex antifading agents. Specific examples of organic antifading agents include hydroquinones, alkoxyphenols, dialkoxyphenols, phenols, anilines, amines, indanes, chromanes, alkoxyanilines, and heterocyclic compounds.

The ink composition preferably has a surface tension of 20 to 40 mN/m at 25° C.

The ink composition preferably has a viscosity of 2 to 10 mPa·s at 25° C.

The inkjet textile printing method includes performing textile printing by ejecting a droplet of the ink composition onto a recording medium in response to a recording signal. The inkjet printer used for textile printing may have any suitable ink nozzle or other component selected for depending on the purpose.

The textile printing method may be used for any known technology, such as charge control technology, which uses electrostatic attraction to eject ink; drop-on-demand (pressure pulse) technology, which uses the pressure of vibrations of piezoelectric devices; acoustic inkjet technology, which converts an electrical signal into an acoustic beam and focuses it on ink to eject the ink by its radiation pressure; or thermal inkjet technology, which uses the pressure of bubbles formed by heating ink.

The recording medium used in the inkjet textile printing method may be a fiber selected from the group consisting of polyesters, celluloses, polyamides, and natural fibers or may be a fabric comprising such a fiber.

Examples of polyester fibers include fibers based on polyethylene terephthalate.

Examples of cellulose fibers include cotton, rayon, triacetate fiber, and diacetate fiber.

Examples of polyamide fibers include nylon fiber.

Examples of natural fibers include silk and wool.

These fibers may be used alone or in a fiber blend. These fibers may have an ink-receiving layer (antibleeding layer). The technique of forming an ink-receiving layer on a fiber is known and used in the art, and fibers having an ink-receiving layer are commercially available. Alternatively, an ink-receiving layer may be formed on the fiber, for example, using a suitable material and method selected from those known and used in the art. The ink-receiving layer may be any layer that has its function.

The inkjet dyeing method includes performing dyeing by steaming or baking a recording medium subjected to textile printing by the inkjet textile printing method.

For example, dyeing may be performed by steaming in a high-temperature steamer, typically at about 80° C. to 250° C., preferably about 170° C. to 180° C., for about 10 seconds to 30 minutes, preferably about 10 minutes. This method is also known as, for example, wet heat fixation.

Alternatively, dyeing may be performed by baking (Thermosol), typically at about 80° C. to 250° C., preferably about 190° C. to 210° C., for about 10 seconds to 30 minutes, preferably about 60 to 180 seconds. This method is also known as, for example, dry heat fixation.

In this way, a dyed article is obtained by the inkjet dyeing method. The term "dyed article" refers to a recording medium dyed by the inkjet dyeing method.

For printing on a fiber by the inkjet textile printing method, for example, a container comprising the ink composition may be set at a predetermined position in an inkjet printer for textile printing that can transport a fabric and may be used to perform printing on a recording medium by the inkjet textile printing method.

In the inkjet textile printing method, pigments may be selected for ink compositions and may be used to provide an ink set for full-color textile printing. For example, yellow, red, blue, and black pigments as described above may be used to provide an ink set of four colors or may optionally be used in combination with other pigments such as green, violet, and orange to brown pigments to provide an ink set of more than four colors.

The ink composition can be smoothly charged into an inkjet head and can be stably ejected without being deflected or causing faded areas during textile printing. The ink composition can also be smoothly ejected without nozzle clogging both during continuous textile printing and intermittent textile printing.

The ink composition also has good storage stability during storage and exhibits significantly good redispersibility when it loses water or other solvent and dries.

The ink composition also gives a bright color without bleeding when used in fiber dyeing and allows high-quality full-color textile printing without mixing of adjacent colors.

The ink composition also has high fastness to various factors such as light, water (including perspiration), and washing after dyeing.

EXAMPLES

The present invention is further described by the following examples, although these examples are not intended to limit the invention.

In the examples, the viscosity was measured using an E-type viscometer when necessary, and the surface tension was measured using a CBVP-Z surface tensiometer available from Kyowa Interface Science Co., Ltd. when necessary.

Synthesis Example 1

In a flask equipped with a stirrer in a glove box purged with nitrogen were placed 90 g (511 mmol) of benzyl methacrylate (available from Tokyo Chemical Industry Co., Ltd.), 2.00 g (6.67 mmol) of ethyl-2-methyl-2-n-butyltellanyl propionate (BTEE), 1.22 g (3.33 mmol) of di-n-butyl ditelluride (DBDT), 0.33 g (2.00 mmol) of 2,2'-azobisisobutyronitrile (available under the trade name AIBN from Otsuka Chemical Co., Ltd., hereinafter referred to as "AIBN"), and 90 g of methoxypropanol. The mixture was reacted at 60° C. for 16 hours. The conversion to polymer was 99.6%. Mw was 16,200. PDI was 1.41.

To the resulting solution were added 45 g (317 mmol) of butyl methacrylate (available from Tokyo Chemical Industry Co., Ltd.), 25 g (290 mmol) of methacrylic acid (available from Tokyo Chemical Industry Co., Ltd.), 0.22 g (1.33 mmol) of AIBN, and 70 g of methoxypropanol. The mixture was reacted at 60° C. for 22 hours. The conversion to polymer was 99.1%.

After the reaction was complete, the reaction solution was poured into 5 L of heptane, and the precipitate was filtered by suction and was dried to obtain 138.2 g (86% yield) of a white powder of Block Copolymer A. The acid value was 104. Mw was 24,300. PDI was 1.49. Mw and PDI were measured after the carboxylic acid components in the block copolymer were converted into methyl esters.

Preparation Example 1

The polymeric dispersant (7 parts) obtained in Synthesis Example 1 was dissolved in 2-butanone (20 parts). To the solution was added a solution of 0.4 part of sodium hydroxide in ion exchange water (50 parts). The mixture was stirred for 1 hour to obtain an emulsion. To the resulting emulsion was added C.I. Pigment Red 122 (Inkjet Magenta E02VP2621 available from Clariant Corporation, 22 parts). The mixture was dispersed in a sand grinder at 1,500 rpm for 15 hours. The resulting dispersion was diluted with ion exchange water and was filtered to remove dispersing beads.

The resulting mother dispersion was concentrated by distilling off 2-butanone and some water at reduced pressure using an evaporator to obtain a dispersion having a solid content of 12.0%, which is referred to as "Dispersion 1". The solid content of the aqueous dispersion was measured by the dry weight method using an MS-70 available from A&D Company, Limited. The pigment present in Dispersion 1 had an average particle size of 122 nm. The dispersion had a viscosity of 4.5 mPa·s at 25° C.

Example 1

An ink of Example 1 for testing was prepared by mixing the ingredients shown in Table 1 below and passing the mixture through a 3 μm membrane filter to remove impurities. The resin content of the ink was adjusted to 6%.

Comparative Example 1

An ink of Comparative Example 1 for testing was prepared by mixing the ingredients shown in Table 1 below, where a styrene-butadiene resin latex (JSR0568 available from JSR Corporation) was used instead of the urethane resin used in the Examples, and a silicone surfactant (BYK-349 available from BYK Japan KK) was used instead of the nonionic surfactant used in the Examples. The resin content of the ink was adjusted to 6%.

Example 2

An ink of Example 2 for testing was prepared as in Example 1 except that the ingredients shown in Table 1 below were used. The resin content of the ink was adjusted to 6%.

The amounts of ingredients in the inks of the Examples and the Comparative Example were adjusted so that they had a viscosity of about 5.5 mPa·s.

TABLE 1

| Ingredients | Example 1 | Example 2 | Comparative Example 1 |
|---|---|---|---|
| Dispersion 1 | 33.24 | 33.24 | 33.24 |
| Ucoat UX-320 | 6.00 | 6.00 | — |
| JSR0568 | — | — | 6.00 |
| Glycerol | — | 23.00 | 24.00 |
| Diglycerol | 20.00 | — | — |
| Propylene glycol | 8.00 | 8.00 | 10.00 |
| Surfynol 420 | 0.55 | 0.55 | — |
| BYK-349 | — | — | 0.25 |
| Water | Balance | Balance | Balance |
| Total | 100 | 100 | 100 |
| Ejectability (tromat) | A | A | C |
| Ejectability (cotton broadcloth) | A | A | C |

[Test for Ejectability after Standing in Open Environment]

Inkjet textile printing was performed on two types of recording media, i.e., tromat (polyester fabric) and cotton broadcloth (cotton fabric), using an inkjet textile printer for industrial use for 10 seconds and was stopped. After standing for 30 minutes, inkjet textile printing was started again. The condition of the print immediately after starting was visually inspected and was rated on the following A-to-C three-level scale. The results are shown in Table 1 above.

In Table 1 above, "ejectability" means the test results for ejectability after standing in an open environment.

A: No blurred area appeared in the print.
B: A slight blurred area appeared in the print.
C: A noticeable blurred area appeared in the print.

As can be seen from the results in Table 1 above, the inks of the Examples exhibited better ejectability after standing in an open environment than the ink of Comparative Example 1.

INDUSTRIAL APPLICABILITY

The ink composition according to the present invention exhibits significantly good ejectability after standing in an open environment and is therefore significantly useful as an ink for inkjet textile printing.

The invention claimed is:

1. An ink composition for inkjet textile printing, comprising:
   a pigment;
   water;
   a polymeric dispersant;
   a polycarbonate urethane resin;
   a water-soluble organic solvent; and
   a nonionic surfactant,
   wherein the polymeric dispersant is an A-B block polymer obtained from copolymerization by living radical polymerization using a polymerization initiator,
   the polymerization initiator is a mixture of an organic tellurium compound represented by formula (1) and an organic ditellurium compound represented by formula (2) or a mixture of an organic tellurium compound represented by formula (1), an azo polymerization initiator, and an organic ditellurium compound represented by formula (2):

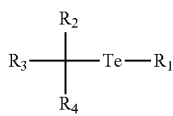

(1)

wherein $R_1$ represents a $C_1$-$C_8$ alkyl group, an aryl group, a substituted aryl group, or an aromatic heterocyclic group; $R_2$ and $R_3$ represent a hydrogen atom or a $C_1$-$C_8$ alkyl group; and $R_4$ represents an aryl group, a substituted aryl group, an aromatic heterocyclic group, an acyl group, an amide group, an oxycarbonyl group, or a cyano group; and

 (2)

wherein, $R_1$ has the same meaning as that of $R_1$ in the above formula (1),
the A-B block polymer comprises an A block and a B block,
the A block consists of a monomer represented by formula (3):

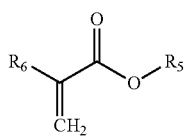

(3)

wherein, $R_5$ represents a hydrogen atom and $R_6$ represents a methyl group, and a monomer represented by formula (3), wherein $R_5$ represents a n-butyl group, and $R_6$ represents a methyl group, and
the B block consists of benzyl methacrylate.

2. The ink composition according to claim 1, wherein, based on the total mass of the ink composition, the pigment is present in an amount of 1% to 15% by mass, the polymeric dispersant is present in an amount of 0.1% to 15% by mass, the polycarbonate urethane resin is present in an amount of 1% to 20% by mass, the water-soluble organic solvent is present in an amount of 10% to 45% by mass, and the nonionic surfactant is present in an amount of 0.01% to 5% by mass, wherein the balance is water.

3. The ink composition according to claim 1, wherein the water-soluble organic solvent comprises a polyglyceryl ether and a C2-C6 diol.

4. The ink composition according to claim 1, wherein the ink composition has a surface tension of 20 to 40 mN/m and a viscosity of 2 to 10 mPa·s at 25° C.

5. A method for manufacturing the ink composition according to claim 1, wherein the polymeric dispersant is an A-B block polymer,
the method comprising:
performing copolymerization by living radical polymerization using a polymerization initiator to obtain the A-B block polymer;
dispersing the pigment in a solution of the polymeric dispersant in the water-soluble organic solvent to obtain a pigment dispersion; and
adding water, the polycarbonate urethane resin, and the nonionic surfactant to the pigment dispersion to obtain the ink composition,
wherein the polymerization initiator is a mixture of an organic tellurium compound represented by formula (1) and an organic ditellurium compound represented by formula (2) or a mixture of an organic tellurium compound represented by formula (1), an azo polymerization initiator, and an organic ditellurium compound represented by formula (2):

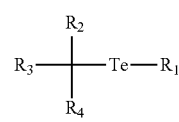

(1)

wherein $R_1$ represents a $C_1$-$C_8$ alkyl group, an aryl group, a substituted aryl group, or an aromatic heterocyclic group; $R_2$ and $R_3$ represent a hydrogen atom or a $C_1$-$C_8$ alkyl group; and $R_4$ represents an aryl group, a substituted aryl group, an aromatic heterocyclic group, an acyl group, an amide group, an oxycarbonyl group, or a cyano group; and

 (2)

wherein, $R_1$ has the same meaning as that of $R_1$ in the above formula (1),
the A-B block polymer comprises an A block and a B block, the A block consists of a monomer represented by formula (3):

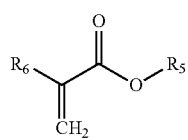
(3)

wherein, $R_5$ represents a hydrogen atom and $R_6$ represents a methyl group and a monomer represented by formula (3), wherein $R_5$ represents a n-butyl group, and $R_6$ represents a methyl group, and the B block consists of benzyl methacrylate.

6. An inkjet textile printing method comprising performing textile printing by ejecting a droplet of the ink composition according to claim 1 onto a recording medium in response to a recording signal.

7. The inkjet textile printing method according to claim 6, wherein the recording medium is a fiber selected from the group consisting of polyesters, celluloses, polyamides, natural fibers, a fiber blend comprising the fiber, and a fabric comprising the fiber.

8. An inkjet dyeing method comprising performing dyeing by steaming or baking a recording medium subjected to textile printing by the inkjet textile printing method according to claim 6.

9. The inkjet dyeing method according to claim 8, wherein the recording medium is steamed or baked at 80° C. to 250° C. for 10 seconds to 30 minutes.

* * * * *